United States Patent [19]

Mori et al.

[11] Patent Number: 5,188,799

[45] Date of Patent: Feb. 23, 1993

[54] WEAR-RESISTANT COPPER-BASE ALLOY

[75] Inventors: Kazuhiko Mori, Okazaki; Minoru Kawasaki, Toyota; Shin Yoshida, Toyota; Hiroyuki Murase, Toyota; Takashi Saito, Aichi; Kouji Tanaka, Aichi; Yoshio Shimura, Aichi, all of Japan

[73] Assignees: Toyota Jidosha Kabushiki Kaisha; Kabushiki Kaisha Toyota Chuo Kenkyusho, both of Japan

[21] Appl. No.: 854,557

[22] Filed: Mar. 19, 1992

[30] Foreign Application Priority Data

Mar. 20, 1991 [JP] Japan .................................. 3-130737

[51] Int. Cl.$^5$ .............................................. C22C 9/00
[52] U.S. Cl. ..................................... 420/469; 148/414; 148/435; 148/442; 420/487; 420/488; 420/495; 420/496; 420/582; 420/587; 420/490
[58] Field of Search ............ 420/587, 582, 585, 586.1, 420/469, 485, 490, 487, 488, 496, 495; 148/414, 435, 442

[56] References Cited

U.S. PATENT DOCUMENTS

| | | | |
|---|---|---|---|
| 3,340,049 | 9/1967 | Quaas et al. | 420/472 |
| 4,818,307 | 4/1989 | Mori et al. | 148/414 |
| 5,004,581 | 4/1991 | Takagi et al. | 420/487 |
| 5,104,748 | 4/1992 | Mori et al. | 148/414 |

FOREIGN PATENT DOCUMENTS

| | | |
|---|---|---|
| 63-157826 | 6/1988 | Japan . |
| 1-111831 | 4/1989 | Japan . |
| 1-152232 | 6/1989 | Japan . |
| 1-205043 | 8/1989 | Japan . |
| 1-215941 | 8/1989 | Japan . |
| 3-60895 | 3/1991 | Japan . |
| 3-87327 | 4/1991 | Japan . |
| 152784 | 6/1963 | U.S.S.R. . |
| 447449 | 3/1975 | U.S.S.R. . |

Primary Examiner—Melvyn J. Andrews
Assistant Examiner—Robert R. Koehler
Attorney, Agent, or Firm—Finnegan, Henderson, Farabow, Garrett & Dunner

[57] ABSTRACT

A wear-resistant copper-base alloy having superior self-lubricity includes, by weight %,
Ni: 10.0 to 30.0%;
Si: 0.5 to 3%;
Co: 2.0 to 15.0%;
at least one metal selected from the group consisting of Mo, W, Nb and V:
2.0 to 15.0%; and
the balance being Cu and unavoidable impurities, and having a structure in which hard phase grains containing 5 vol% or more of silicide of at least one metal selected from the group consisting of Mo, W, Nb and V are uniformly dispersed in an amount of 10 to 60 vol% in a copper-rich matrix, to which 2.0 to 15.0% of Fe and/or 1.0 to 10.0% of Cr may be further added.

5 Claims, 4 Drawing Sheets (A : ×200)

(B : ×200)

(C : ×200)

WEAR-RESISTANT COPPER-BASE ALLOY

BACKGROUND OF THE INVENTION

1. Field of the Invention

The present invention relates to a Cu-(copper)-base alloy, and more particularly, to a wear-resistant Cu-base alloy classified as a dispersion strengthened Cu-base alloy, used for an overlay (hardfacing layer) formed on a metal substrate, and having good self-lubricity.

2. Description of the Related Art

Wear-resistant materials of Cu-base alloy include precipitation-hardened alloys such as beryllium (Be) copper alloys and Cu-Ni-Si alloys (e.g., Corson alloy), and dispersion-strengthened alloys in which hard particles of, e.g., oxide ($SiO_2$, $Cr_2O_3$, BeO, $TiO_2$, $ZrO_2$, MgO, MnO, etc.) are dispersed in a Cu-base matrix.

Among the Cu-base alloys, the beryllium copper alloy, in particular, has a strength (a tensile strength of 100 kg/$mm^2$ or more) comparable to that of steel and a high hardness (of HV 300 or more), but when the Cu-base alloys subjected to a precipitation hardening treatment (age hardening treatment) are heated at a temperature (350° to 450° C.) higher than a precipitation (aging) temperature, the hardness thereof is steeply lowered, and thus such an alloy is not suitable as a wear-resistant material. It is not easy to apply the precipitation hardening treatment on large alloy members (parts), and this heat-treatment is apt to generate strain in alloy members (parts) and requires a long treating time. Furthermore, a precipitation is controlled by diffusion in a solid phase, and thus the precipitating particles have a fine size of several micrometers and a relatively high hardness due to the precipitation hardening is attained. Nevertheless, under a wear condition involving sliding (slide abrasion condition), fatal wear often occurs.

One type of the particle dispersion-strengthened Cu-base alloys made through an internal oxidation process has dispersed fine oxide particles similar to the precipitate particles by aging treatment, since such oxide particles are formed by an oxygen diffusion in a solid phase matrix. The precipitation in a solid phase requires a long treating time, and such a heat-treatment is not easily applied to large alloy members and is apt to generate strain. Another type of particle dispersion-strengthened alloys obtained by the sintering process contains dispersed oxide particles having a desired grain size, by controlling a grain size of raw material powders, but it is difficult to attain a uniform dispersion at a micrometer order level. Furthermore, if a Cu-base alloy layer of this type is locally deposited, to form an overlay on a metal substrate, it is necessary to heat the substrate as a whole to a sintering temperature, which generates deformation and strain in the substrate, and thus this type of Cu-base alloy is not suitable for an overlay.

The present inventors have studied particle dispersion-strengthened Cu-base alloys for wear-resistant overlays (hardfacing layers) deposited locally or wholly on a metal substrate, and several of the present inventors have proposed Cu-Ni-Fe-(B)-Si system Cu-base alloys as the wear-resistant dispersion-strengthened Cu-base alloys in which hard particles of silicide and/or boride are dispersed by rapid solidification, in other patent applications. For example, U.S. Pat. No. 4,818,307, based on Japanese Unexamined Patent Publication (Kokai) No. 63-157826, discloses Cu-Ni-Fe-Si-B alloys having dispersed hard particles of silicide and boride of the Fe-Ni system, and Japanese Unexamined Patent Publication (Kokai) No. 1-111831 discloses Cu-Fe-Ni-Cr-Si-(B) alloys having dispersed hard particles of silicide and boride of the Fe-Ni-Cr system.

During the operation of an internal combustion engine (e.g., automobile engine), face portions of exhaust valves of the engine are heated to 700° C. or more, and an exhaust gas has a temperature of 1000° C. or more. Therefore, an overlay of one of the dispersion-strengthened Cu-base alloys deposited on each of valve seats comes into contact with the heated valve face portion, and further, is exposed to the high temperature exhaust gas, and thus the surface temperature of the Cu-base alloy overlay of the valve seat is raised to a high temperature and a portion of the overlay easily adheres to the valve face. Once this adhesion occurs, the Cu-base alloy adhering to the valve comes into contact with the Cu-base alloy overlay, and accordingly, the adhesion becomes much greater and causes considerable wear (adhesion) of the overlay of the valve seat. It has been found that the proposed Cu-base alloys mentioned above, utilizing a strengthening effect of hard particles, cannot prevent adhesion of a Cu-rich phase of a matrix of the Cu-base alloys. It also has been found that conventional dispersion-strengthened Cu-base alloys strengthened by a second phase cannot prevent the adhesion of the Cu-rich phase.

To suppress the adhesion of the Cu-rich phase of a matrix, several of the present inventors proposed a method of dissolving Zn (zinc) and/or Sn (tin) in primary crystals of the matrix (see Japanese Unexamined Patent Publication (Kokai) No. 3-60895), and a method of dispersing Pb (lead) among dentrites of a Cu-base α phase (see Japanese Unexamined Patent Publication (Kokai) Nos. 1-205043 and 3-87327).

Although the proposed Cu-base alloys improve the resistance to adhesion, the following problems arise. Since the melting points of Zn, Sn and Pb (Zn=420° C., Sn=231.9° C., Pb=327.4° C.) are lower than that of Cu, in a deposition (build-up) process of an overlay of the Cu-base alloy using a laser (as shown in FIG. 1), these alloying elements (metals) are vaporized during the deposition treatment, and thus it is difficult to maintain a desired composition of the alloy. Since the Zn has a high vapor pressure, a plasma is easily generated, and thus a bead (i.e., deposited layer) is not stably formed. Furthermore, the Pb vapor is toxic, and thus a safety system, such as an exhaust apparatus is required.

SUMMARY OF THE INVENTION

An object of the present invention is to provide a Cu-base alloy which is able to stably form an overlay with a desired composition, does not generate a toxic gas, and provides a superior suppression of adhesion at a high temperature compared to the proposed prior art Cu-base alloys.

This and other objects of the present invention are attained by providing a wear-resistant dispersion-strengthened Cu-base (copper-base) alloy having a superior self-lubricity and comprising, by weight %, Ni; 10.0 to 30.0%;
Si: 0.5 to 5.0%;
Co: 2.0 to 15.0%;
at least one metal selected from the group consisting of Mo, W, Nb and V:
2.0 to 15.0%; and
the balance being Cu and unavoidable impurities, and
having a microstructure in which hard phase grains containing not less than 5 vol % of silicide of at least one metal selected from the group consisting of Mo, W, Nb and V are uniformly dispersed in an amount of 10 to 60 vol % in a copper-rich matrix.

Preferably, the Cu-base alloy consists comprising, by weight %,
Ni: 12.0 to 25.0%;
Si: 2.0 to 4.0%;
Co: 4.0 to 12.0%;
at least one metal selected from the group consisting of Mo, W, Nb and V:
4.0 to 10.0%; and
the balance being Cu and unavoidable impurities.

This alloy is of a structure resulted from the so-called monotectic reaction, i.e., of a structure in which hard phase grains containing hard particles of silicide of Mo, etc. and solid solution of Ni, Co, etc. are dispersed in the Cu-base matrix in which Ni is dissolved in a solid solution state. This structure is obtained, for example, by rapidly melting the material for the alloy to form two liquid phases immiscible with each other, and stirring to form the dispersion and then rapidly solidifying the dispersion.

Also, preferably the Cu-base alloy further comprises, by weight %, at least one metal selected from the group consisting of 2.0 to 15.0% (preferably 3.0 to 10.0%) of Fe and 1.0 to 10.0% (preferably 1.0 to 5.0%) of Cr. This addition improves ductility and heat-resistance and suppresses the effect of an attack on an opposite member.

The Cu-base alloy according to the present invention is easily melted and deposited on a metal substrate by using a high density heating energy, such as a laser, a TIG arc, a plasma arc and an electron beam, to form an overlay (hardfacing layer), in the same manner as used in the proposed patent applications (e.g., U.S. Pat. No. 4,818,307). A raw material of the Cu-base alloy is prepared as powder or as a welding rod.

The reasons for defining the composition of the Cu-base alloy according to the present invention will be explained in the following.

Ni (nickel) is dissolved in the Cu-base matrix in a solid solution state, to strengthen the matrix, and forms the hard silicide particles among dendrites to improve the wear-resistance due to the dispersion strengthening. Ni also forms another type of hard phase grains in conjunction with Co, Fe, Mo etc. Less than 10% of Ni does not sufficiently strengthen the matrix and not improve the heat-resistance, and more than 30% of Ni is apt to generate cracks in the overlay (bead) and lowers the weldability (depositability) to a metal substrate, especially to an Al alloy substrate. In the worst case, it is possible to peel a local welding (deposition) of the Cu-base alloy from the metal substrate, with the result that the intended improvement of the wear-resistance is not obtained. The weldability (depositability) means wettability of the deposited Cu-base alloy to the substrate. The preferable content of Ni is from 12.0 to 25.0%.

Si (silicon) forms hard particles of silicide (Ni silicide, Mo (W, Nb, V) silicide) and strengthens the Cu-base matrix. In particular, the Mo (W, Nb, V) silicide has a function of maintaining a high-temperature lubricity. Less than 0.5% of Si does not sufficiently form silicide hard particles, and more than 5% of Si lowers the ductility of the Cu-base alloy overlay and leads to the generation of cracks in the overlay. The preferable content of Si is from 2.0 to 4.0%.

Mo (molybdenum) is an effective metal, which forms a compound (silicide) with silicon and improves the wear-resistance and lubricity at a high temperature. The Mo silicide easily decomposes to form an oxide ($MoO_3$) at a relatively low temperature of 500° to 700° C. under a low partial pressure of oxygen. The $MoO_3$ has a low melting point and covers the whole surface of the Cu-base alloy to prevent primary crystals (Cu solid solution) from coming into direct contact with an opposite member, and thus maintain a high self-lubricity. Less than 2% of Mo does not attain the high self-lubricity at a high temperature, and more than 15% of Mo lowers the ductility of the Cu-base alloy overlay and leads to the generation of cracks in the overlay.

Co (cobalt) forms silicide in conjunction with Mo and stabilizes the silicide. Co also forms solid solutions in conjunction with Ni around the hard Mo silicide. Less than 2% of Co does not attain such effects, and more than 15% of Co coarsens hard phase grains and is apt to generate cracks at a deposition on a metal substrate. In particular, when the metal substrate is of Al, the weldability is fatally lowered. The preferable content of Co is from 4.0 to 12.0%.

Each of W (tungsten), Nb (niobium) and V (vanadium) forms silicide which decomposes to oxide having a high lubricity at a high temperature, in a similar manner to that of Mo. Less than 2% of Mo, W, Nb and V in total does not attain such an effect, and more than 15% of Mo, W, Nb and V in total lowers the ductility and is apt to generate cracks. The preferable content of these components is from 4.0 to 10.0%.

Fe (iron) has a function similar to that of Co, is little dissolved in the Cu-base matrix in a solid solution state, is mainly present in the dispersed hard phase grains (aggregate of silicide and Co-Ni solid solution). Further, it improves the ductility and heat-resistance of the dispersion phase. Less than 2% of Fe does not attain such effects, and more than 15% of Fe remarkably coarsens hard phase grains and increases the effect of an attack on an opposite member. The preferable content of Fe is from 3.0 to 10.0%.

Cr (chromium) has a function similar to that of Fe and Co, is mainly present in the dispersed hard phase grains (mixture of silicide and Co-Ni solid solution), and improves the toughness and heat-resistance of the dispersion phase. Less than 1% of Cr does not attain such effects, and more than 10% of Cr remarkably coarsens hard phase grains and increases the effect of an attack on an opposite member. The preferable content of Cr is from 1.0 to 5.0%.

The hard phase grains dispersed in the Cu-rich matrix (solid solution) contain silicides of mainly at least one of Mo, W, Nb and V. Such silicides occupy a volume of 5% or more in the hard phase grains. Less than 5 vol % of silicides does not attain a high lubricity at a high temperature. The amounts (ratio) of the hard phase grains in the Cu-rich matrix is in the range from 10 to 60 vol %. Less than 10 vol % provides an insufficient wear-resistance, and more than 60 vol % lowers the ductility, is apt to generate cracks, remarkably coarsens hard phase grains, and increases the effect of an attack on an opposite member.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

An overlay of the dispersion-strengthened alloy of the present invention is formed on a metal substrate by laser irradiation, in a manner described in, e.g., U.S. Pat. No. 4,818,307 (i.e., Japanese Unexamined Patent Publication No. 63-157826).

Figure 1:
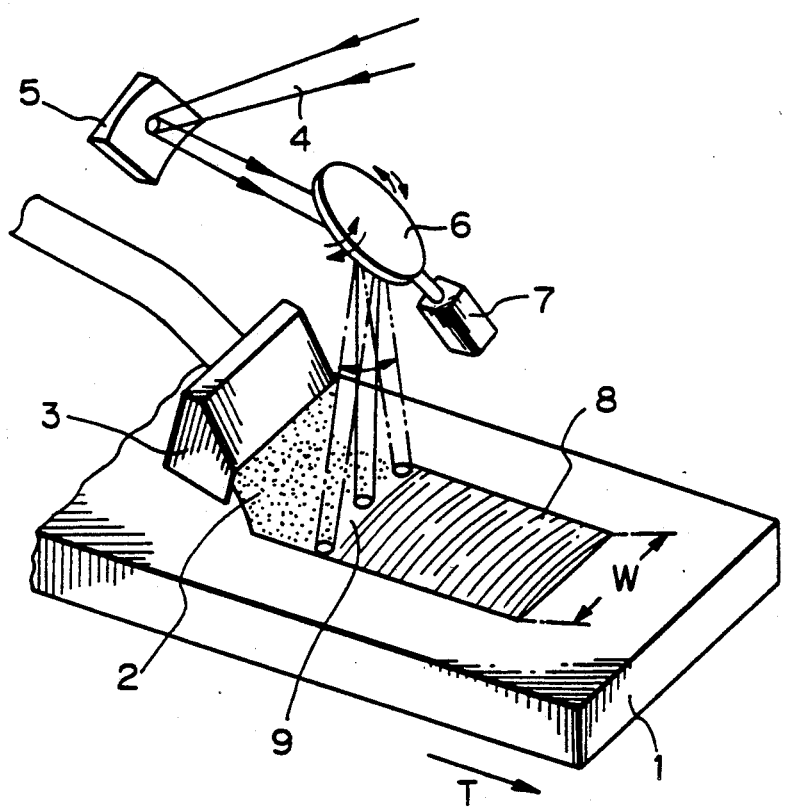
FIG. 1 is a schematic perspective view showing an apparatus for depositing the Cu-base alloy on the metal substrate to form an overlay by using a laser beam.

The following examples and comparative examples are performed by using an apparatus shown in FIG. 1.

A metal substrate (e.g., Al alloy plate) 1 is continuously moved at a constant velocity of 450 to 2000 mm/min in a direction of an arrow T, and an alloy powder or a mixed powder 2 of the Cu-base alloy according to the present invention or comparative examples is continuously fed onto the metal substrate 1 from a hopper (not shown) through a powder feed pipe 3. The fed powder 2 (having a particle size of 40 to 150 μm) has a width W taken at right angles to the moving direction T. A laser beam 4 emitted from a laser source (not shown) is reflected by a reflecting mirror 5, and further reflected by an oscillating mirror 6, to irradiate the powder 2 fed on the metal substrate 1. The laser beam 4 is concentrated to a diameter of 0.5 to 5.0 mm and an energy density of $1 \times 10^2$ to $2 \times 10^4$ W/mm$^2$. The oscillating mirror 6 is swung within a predetermined angular range by a swing mechanism 7 such as a galvanometer, so that the laser beam 4 scans the powder 2 at a frequency of 10 to 500 Hz in a direction perpendicular to the moving direction T of the metal substrate 1.

When the powder 2 on the metal substrate 1 is irradiated with the laser beam 4, it is instantaneously melted to form a melt 9. The melt 9 is agitated by scanning the laser beam 4. Thereafter, when the melt 9 is not irradiated with the laser beam 4, as the metal substrate 1 is moved in a direction T, the heat of the melt 9 is removed by a heat transfer to the metal substrate 1, to thereby rapidly solidify the melt 9 into an overlay (deposited layer) 8 of a dispersion-strengthened Cu-base alloy, as shown in FIG. 1.

EXAMPLE

Cu-base alloy powders A to G according to the present invention and Cu-base alloy powders H and I of comparative examples having compositions shown in the following table were prepared by a conventional powder formation process.

TABLE

|   | Cu | Ni | Si | Co | Mo | W | Nb | V | Fe | Cr | B |
|---|---|---|---|---|---|---|---|---|---|---|---|
| * A | bal. | 20.0 | 3.0 | 11.0 | 9.0 | — | — | — | — | — | — |
| B | bal. | 16.0 | 2.8 | 9.0 | 7.0 | — | — | — | 6.0 | 2.0 | — |
| C | bal. | 25.0 | 3.3 | 6.0 | 4.0 | 5.0 | — | — | 6.0 | 1.5 | — |
| D | bal. | 20.0 | 2.5 | 8.0 | — | 8.0 | — | — | 4.0 | — | — |
| E | bal. | 22.0 | 2.5 | 9.0 | — | — | 8.0 | — | 2.0 | — | — |
| F | bal. | 21.0 | 2.5 | 9.0 | — | — | — | 8.0 | 6.0 | — | — |
| G | bal. | 18.0 | 3.0 | 6.0 | 4.0 | 3.0 | — | 3.0 | 4.0 | 1.5 | — |
| ** H | bal. | 20.0 | 3.0 | — | — | — | — | — | 8.0 | — | 1.5 |
| I | bal. | 28.5 | 3.3 | — | 3.0 | — | — | — | 6.0 | 12.0 | 1.5 |

*Embodiments of Present Invention
**Comparative Examples

The alloy powder H corresponded to an alloy proposed by Japanese Unexamined Patent Publication No. 63-157826 (particularly, claim 1 thereof), and the alloy powder I corresponded to an alloy proposed by Japanese Unexamined Patent Publication No. 1-152232.

Each of the alloy powders was fed onto the Al alloy substrate (Al-base cast alloy (Al-3% Cu-6% Si)) and was irradiated with a laser beam as a heating source, to deposit a dispersion-strengthened Cu-base alloy overlay (hardfacing layer) A to I, respectively, by adopting the following conditions.

Laser powder: 4.5 kW
Laser beam diameter: 2.5 mm
Laser irradiation energy density: 225 W/mm$^2$
Laser beam oscillation width: 8 mm
Laser oscillation frequency: 200 Hz
Substrate movement velocity: 800 mm/min The formed overlays A to I were then ground to form test pieces A to I, respectively.

Figure 2:
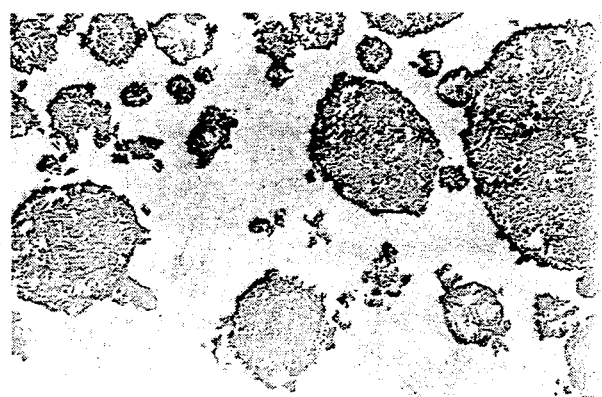
FIG. 2 is an optical micrograph (×200) showing the microstructure of a dispersion-strengthened Cu-base alloy overlay (sample) A according to the present invention.
Figure 3:
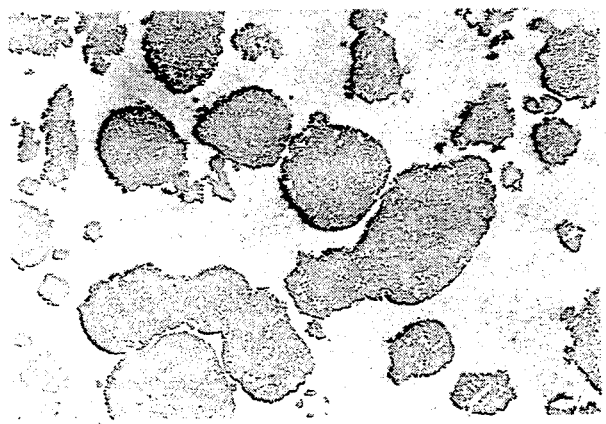
FIG. 3 is an optical micrograph (×200) showing the metal structure of a dispersion-strengthened Cu-base alloy overlay (sample) B according to the present invention.
Figure 4:
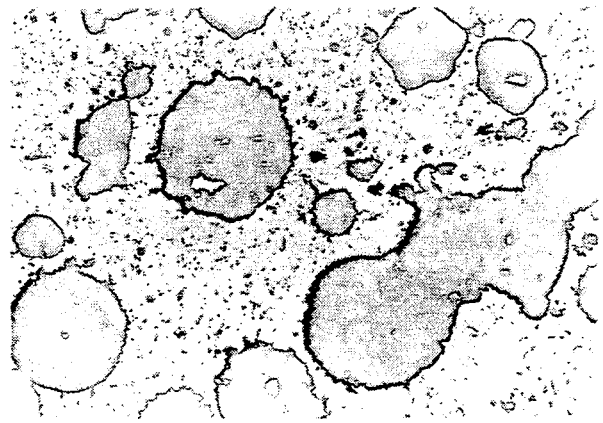
FIG. 4 is an optical micrograph (×200) showing the microstructure of a dispersion-strengthened Cu-base alloy overlay (sample) C according to the present invention.

The microstructures of the overlays A to C of the Cu-base alloys of the present invention are shown in the photomicrographs (×200) of FIGS. 2, 3, and 4, respectively, in which relatively large hard phase particles are uniformly dispersed in Cu-base matrix. The particles are complexants of silicides of Mo and Co and solid solution of Ni and Co, in which Fe and Cr are dissolved.

Test of Adhesive Wear Property

Figure 5:
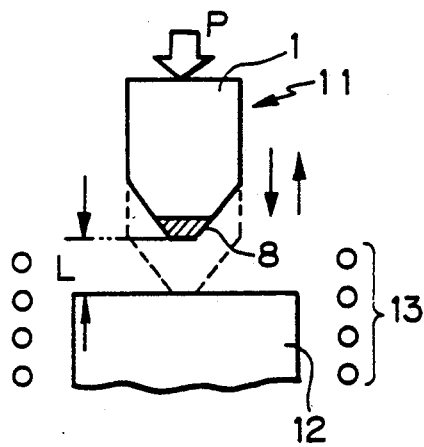
FIG. 5 is a schematic illustration of a test piece and an opposite member, in a test for evaluating the resistance thereof to adhesion.

To evaluate an adhesion property of the Cu-base alloy overlays A to I under a high-temperature ambience, as shown in FIG. 5, the test piece 11 consisting of the substrate 1 and with the overlay 8 was pushed against an opposite (valve) member 12 heated by a heater 13 and then a height of the Cu-base alloy material adhered to the member 12 was measured. Namely, the test piece 11 was reciprocatively pushed against the member 12 made of heat-resisting steel (SUH 35: JIS G 4311) under the following conditions.

| Heating temperature: | 300 to 400° C. (at the contact surface); |
| Pushing force P: | 20 kg (a pressure of 5 kg/mm$^2$); |
| Reciprocating distance L: | 5 mm; |
| Reciprocating rate: | 500 cycles/min; |
| Test time: | 30 minutes. |

Figure 6:
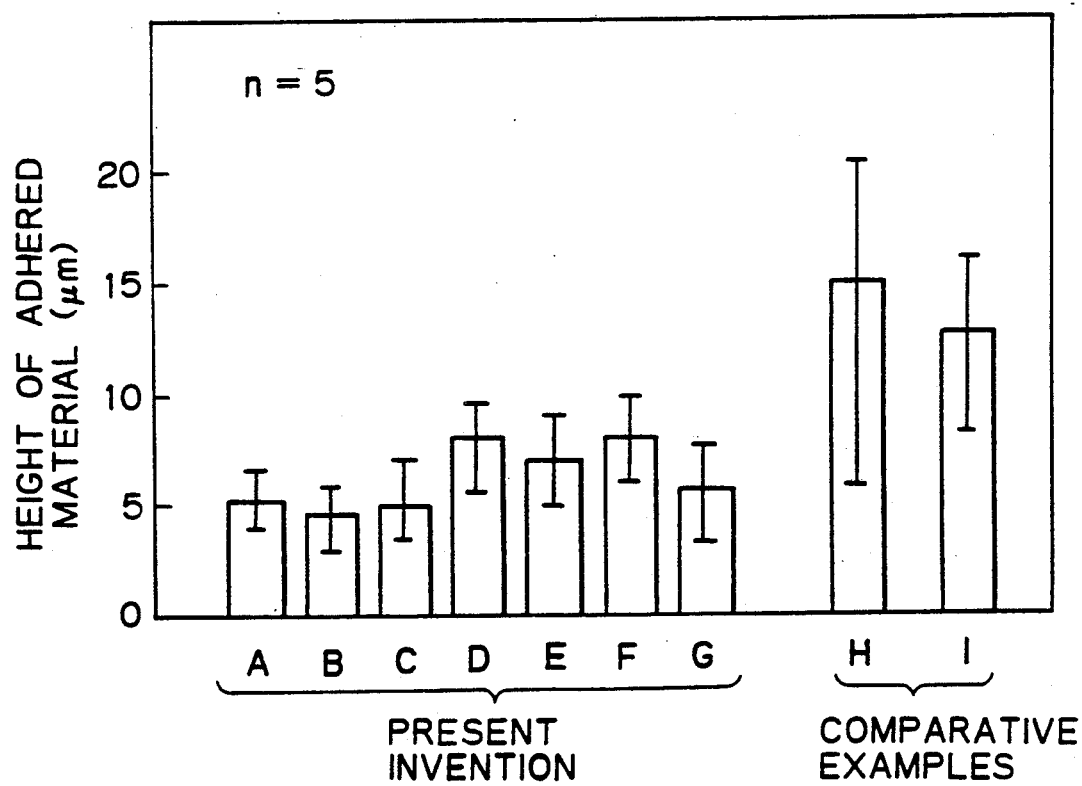
FIG. 6 is a graph showing the results (height of adhesive materials) of the adhesive wear tests.

After test, a height of the Cu-base alloy materials adhered to the valve member 12 was measured with a roughness instrument, to obtain the data shown in FIG. 6. As is obvious from FIG. 6, the Cu-base alloys A to G of the present invention have lower heights and less amounts of adhered Cu-base alloy materials (i.e., a better resistance to adhesion), compared with the Cu-base alloys H and I of the comparative examples. The Cu-base alloys D, E and F were supplemented with W, Nb and V, respectively, instead of Mo, and the test pieces D, E and F have adhered material heights somewhat larger than those of the test pieces A and B (added with Mo).

Furthermore, since Mo, W, Nb and V have an affinity for B (boron) being stronger than that for Si, in Cu-base alloys containing a certain amount or more of B (boron), the whole of Mo, W, Nb and V is crystallized into borides and does not form silicides. In this case, a sufficient lubricity at a high-temperature is not obtained. Therefore, although the Cu-base alloy I (of a comparative example) contains Mo, the alloy I is inferior in the resistance to adhesion due to the content of B.

Test of Bead Failure Strain

The dispersion-strengthened Cu-base alloy overlay (hardfacing layer) having a width of 8 mm and a maximum thickness of 2 mm deposited on the Al alloy substrate was ground to a thickness of 1 to 1.5 mm, and a strain gauge was then stuck on the ground surface of the overlay. Where a pressure was applied on the Al alloy substrate with a compression tester in a direction perpendicular to the bead direction and parallel to the deposited surface of the substrate, to generate a tensile stress in the overlay (i.e., to set the overlay on a bending tester), the strain gauge detected an elongation of the overlay. When cracks or exfoliation of the overlay appeared, the detected strain was regarded as a bead failure strain. The test pieces A, B, C, H and I were tested to obtain the results shown in FIG. 7.

Figure 7:
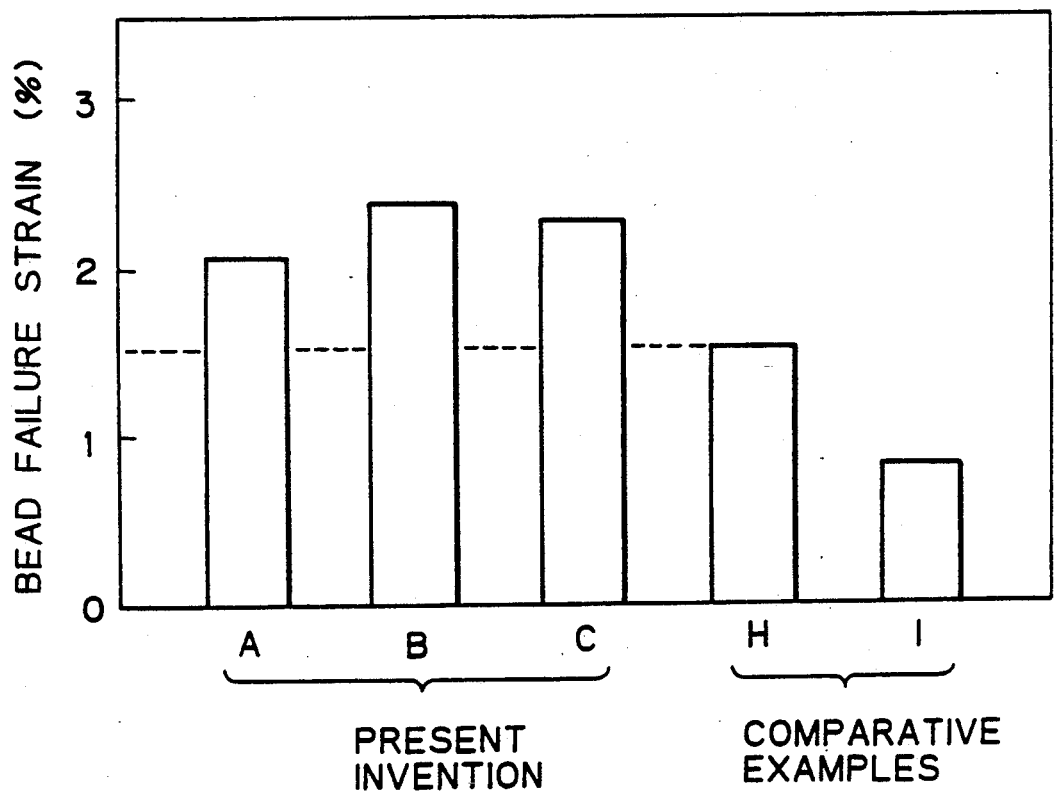
FIG. 7 is a graph showing the results (strain on beads (overlays) at failure) obtained by using a compression tester.

As shown in FIG. 7, the Cu-base alloys (A, B and C) according to the present invention have a superior resistance to crack generation and to exfoliation under static load deformation, compared to those of the alloys H and I of the comparative examples.

As mentioned above, the dispersion-strengthened Cu-base alloys according to the present invention have a superior resistance to adhesion at a high temperature, improved self-lubricity caused by forming silicides of Mo, W, Nb, and V and decomposing the silicides to form oxides, and better withstand static deformation, compared with the conventional Cu-base alloys. Furthermore, it is possible to form an overlay by depositing the dispersion-strengthened Cu-base alloy wholly or locally on a metal substrate. Therefore, the overlay of the dispersion-strengthened alloy of the present invention can be formed on portions of various mechanical parts including a valve seat, which must be wear-resistant, to improve the properties of the mechanical parts.

It will be obvious that the present invention is not restricted to the above-mentioned embodiments, and that many variations are possible for persons skilled in the art without departing from the scope of the invention.

We claim:

1. A wear-resistant copper-base alloy having a superior self-lubricity consisting essentially of, by weight %,
   Ni: 10.0 to 30.0%;
   Si: 0.5 to 5.0%:
   Co: 2.0 to 15.0%;
   at least one metal selected from the group consisting of Mo, W, Nb and V:
   2.0 to 15.0%; and
   the balance being Cu and unavoidable impurities, and having a structure in which hard phase grains containing not less than 5 vol % of silicide of at least one metal selected from the group consisting of Mo, W, Nb and V are uniformly distributed in an amount of 10 to 60 vol % in a copper-rich matrix.

2. A wear-resistant copper-base alloy according to claim 1 consisting essentially of, by weight %,
   Ni: 12.0 to 25.0%;
   Si: 2.0 to 4.0%;
   Co: 4.0 to 12.0%;
   at least one metal selected from the group consisting of Mo, W, Nb and V:
   4.0 to 10.0%
   the remainder being Cu and unavoidable impurities.

3. A wear-resistant copper-base alloy according to claim 1, further comprising, by weight %, at least one metal selected from the group consisting of 2.0 to 15.0% of Fe and 1.0 to 10.0% of Cr.

4. A wear-resistant copper-base alloy according to claim 2, further comprising, by weight %, at least one metal selected from the group consisting of 2.0 to 15.0% of Fe and 1.0 to 10.0% of Cr.

5. A wear-resistant copper-base alloy according to claim 4, wherein the content of Fe is from 3.0 to 10.0%, and that of Cr is from 1.0 to 5.0%.

* * * * *